(12) United States Patent
Naito

(10) Patent No.: US 9,543,610 B2
(45) Date of Patent: Jan. 10, 2017

(54) FUEL CELL VEHICLE

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 14/314,034

(22) Filed: Jun. 25, 2014

(65) Prior Publication Data

US 2015/0010841 A1 Jan. 8, 2015

(30) Foreign Application Priority Data

Jul. 2, 2013 (JP) ................... 2013-139177

(51) Int. Cl.
*H01M 8/24* (2016.01)
*B60L 11/18* (2006.01)
*H01M 8/04* (2016.01)

(52) U.S. Cl.
CPC ........ *H01M 8/2475* (2013.01); *B60L 11/1883* (2013.01); *H01M 8/04201* (2013.01); *H01M 8/04097* (2013.01); *H01M 8/04164* (2013.01); *H01M 8/2485* (2013.01); *H01M 2250/20* (2013.01); *Y02E 60/50* (2013.01); *Y02T 90/32* (2013.01); *Y02T 90/34* (2013.01)

(58) Field of Classification Search
None
See application file for complete search history.

(56) References Cited

U.S. PATENT DOCUMENTS

2014/0367182 A1* 12/2014 Yoshinaga .......... B60L 11/1898
180/68.4

FOREIGN PATENT DOCUMENTS

| JP | 2002-362164 | | 12/2002 |
|---|---|---|---|
| JP | 2002-367666 | | 12/2002 |
| JP | 2009-259593 | | 11/2009 |
| WO | WO 2013/111669 | * | 8/2013 |

* cited by examiner

Primary Examiner — Jonathan Crepeau
(74) Attorney, Agent, or Firm — Mori & Ward, LLP

(57) ABSTRACT

A fuel cell vehicle includes a fuel cell stack, a front side panel, and a fuel gas device. The fuel cell stack includes a plurality of fuel cells, one end and another end, a first end plate, and a second end plate. The first end plate is disposed at the one end. The second end plate is disposed at the another end. The front side panel is connected to side surfaces of the first and second end plates. The side surfaces face forward in a vehicle driving direction. The front side panel includes a first protruding end portion that protrudes from the first end plate outward in a vehicle width direction. The fuel gas device is disposed on the first end plate so as to be covered by the first protruding end portion when seen from a front side in the vehicle driving direction.

16 Claims, 9 Drawing Sheets

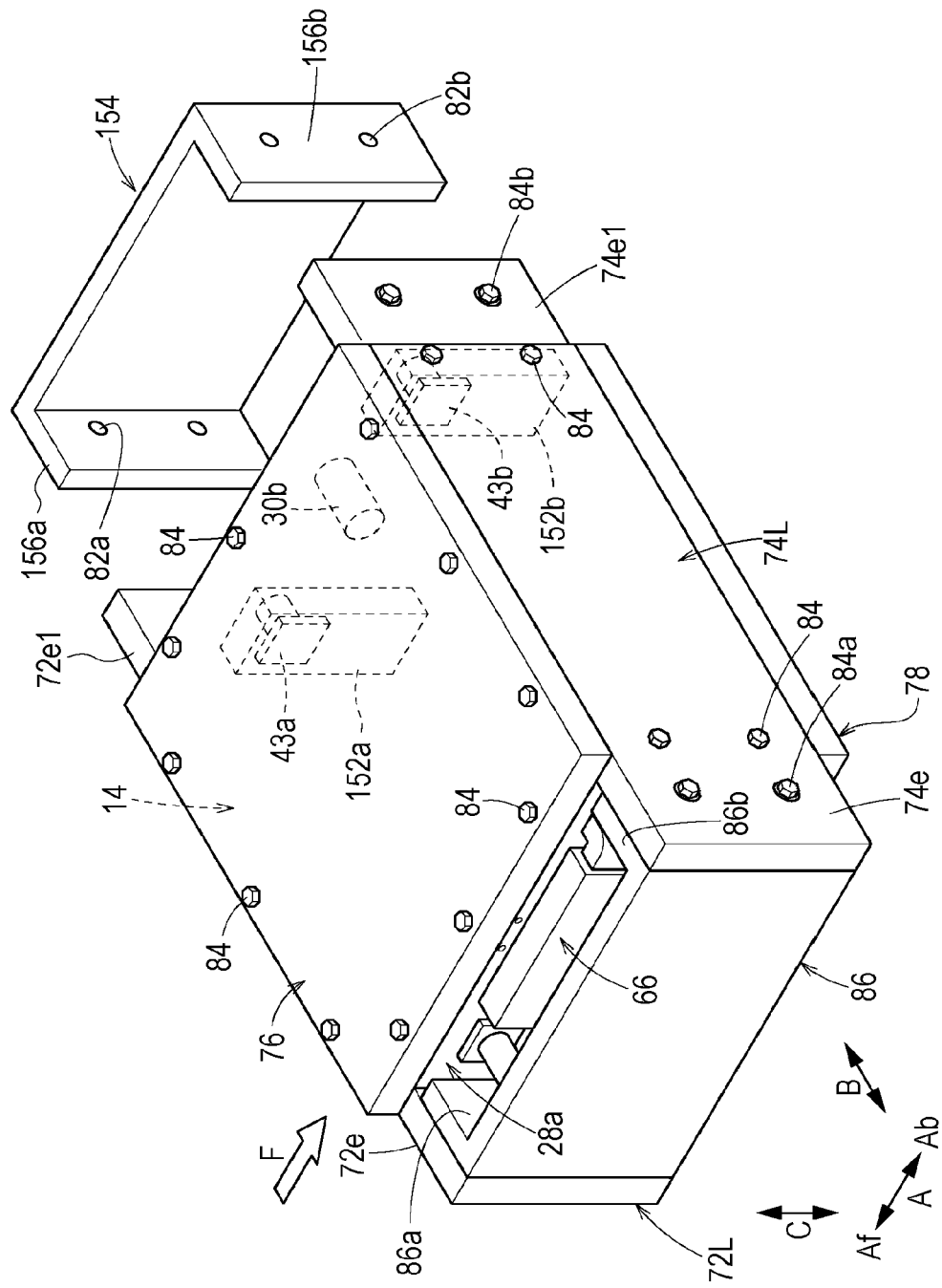

FUEL CELL VEHICLE

CROSS-REFERENCE TO RELATED APPLICATIONS

The present application claims priority under 35 U.S.C. §119 to Japanese Patent Application No. 2013-139177, filed Jul. 2, 2013, entitled "Fuel Cell Vehicle." The contents of this application are incorporated herein by reference in their entirety.

BACKGROUND

1. Field

The present disclosure relates to a fuel cell vehicle.

2. Description of the Related Art

For example, a solid polymer electrolyte fuel cell includes a membrane electrode assembly (MEA) in which an anode electrode and a cathode electrode are disposed on both sides of an electrolyte membrane that is made from a solid polymer ion-exchange membrane. The membrane electrode assembly is sandwiched between separators to form a power generation cell. Typically, a predetermined number of such power generation cells are stacked and used, for example, as a vehicle fuel cell stack.

In order to use a fuel cell stack particularly as a vehicle fuel cell stack, it is desirable to compactly and efficiently arrange fuel gas (for example, hydrogen gas) devices, oxidant gas (for example, air) devices, and the like. Moreover, because pipes through which a fuel gas, an oxidant gas, and a coolant flow are connected to a fuel cell stack, when a vehicle crash occurs, it is necessary to adequately protect the pipes connected to the fuel cell stack, the fuel gas devices, and the like.

For example, Japanese Unexamined Patent Application Publication No. 2002-362164 discloses a piping structure for a fuel cell. In this piping structure, a case for containing a fuel cell stack is mounted on a vehicle body. Distribution/collection portions of fluid pipes connected to the fuel cell stack and fluid pipe portions between the fuel cell stack and the distribution/collection portions are disposed in the case.

SUMMARY

According to one aspect of the present invention, a fuel cell vehicle includes a fuel cell stack, a front side panel, and a fuel gas device. The fuel cell stack includes a plurality of fuel cells and a pair of end plates. The plurality of fuel cells are stacked in a vehicle width direction. Each of the fuel cells generates electric power by an electrochemical reaction between a fuel gas and an oxidant gas. The pair of end plates are disposed at both ends of the fuel cell stack in a stacking direction. The front side panel is fixed to side surfaces of the pair of end plates. The side surfaces face forward in a vehicle driving direction. The front side panel includes a protruding end portion that protrudes from one of the end plates outward in the vehicle width direction. The fuel gas device is disposed on the one of the end plates so as to be covered by the protruding end portion when seen from a front side in the vehicle driving direction.

According to another aspect of the present invention, a fuel cell vehicle includes a fuel cell stack, a front side panel, and a fuel gas device. The fuel cell stack includes a plurality of fuel cells, one end and another end, a first end plate, and a second end plate. The plurality of fuel cells are stacked in a stacking direction extending in a vehicle width direction. Each of the plurality of fuel cells is configured to generate electric power through an electrochemical reaction between a fuel gas and an oxidant gas. The another end is opposite to the one end in the stacking direction. The first end plate is disposed at the one end. The second end plate is disposed at the another end. The front side panel is connected to side surfaces of the first and second end plates. The side surfaces face forward in a vehicle driving direction. The front side panel includes a first protruding end portion that protrudes from the first end plate outward in the vehicle width direction. The fuel gas device is disposed on the first end plate so as to be covered by the first protruding end portion when seen from a front side in the vehicle driving direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a partially exploded perspective view of a main part of a fuel cell vehicle according to a fourth embodiment.

DESCRIPTION OF THE EMBODIMENTS

Figure 1:
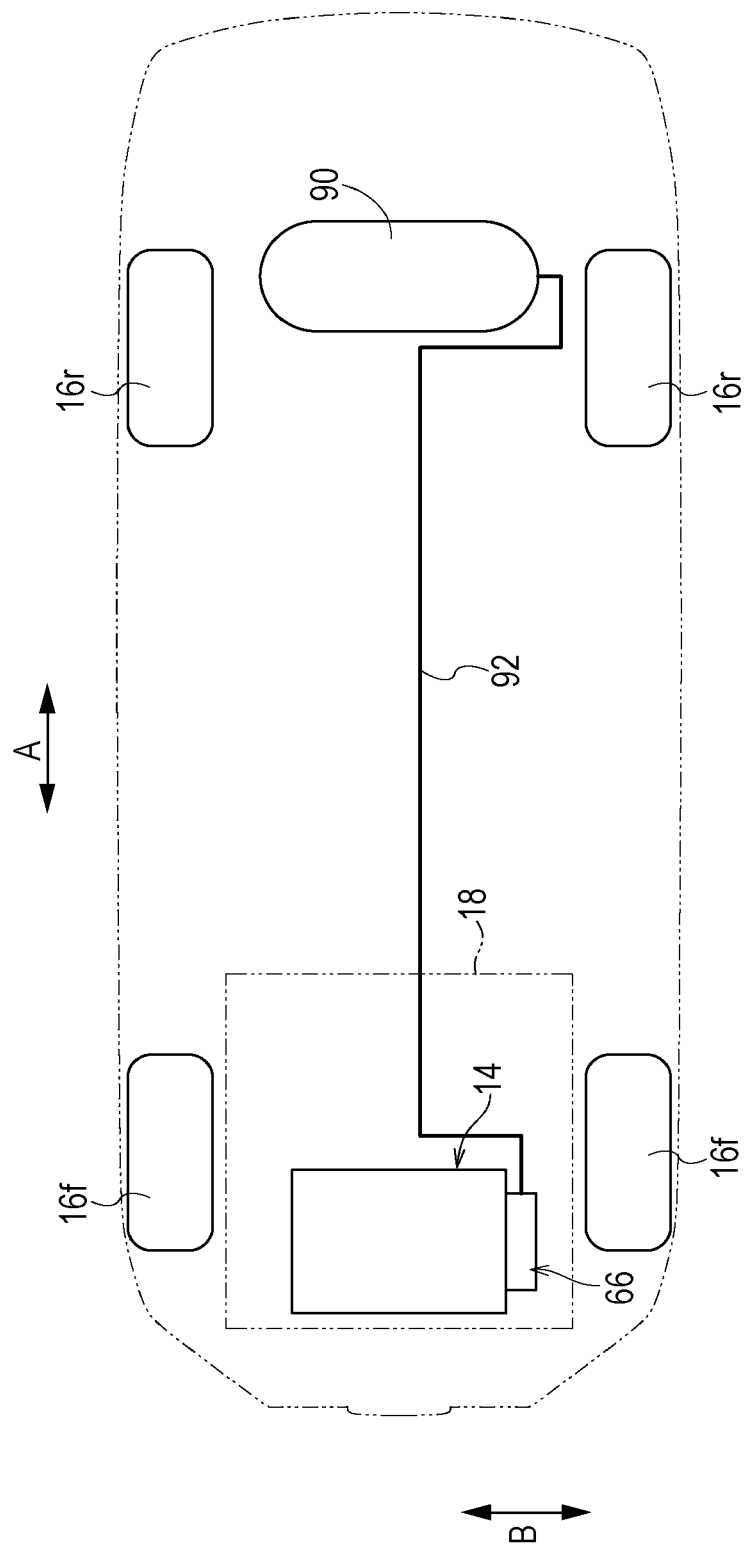
FIG. 1 is a schematic diagram showing the overall structure of a fuel cell vehicle according to a first embodiment.

The embodiments will now be described with reference to the accompanying drawings, wherein like reference numerals designate corresponding or identical elements throughout the various drawings.

Referring to FIG. 1, a fuel cell vehicle 10 according to a first embodiment is, for example, a fuel cell electric vehicle. In the fuel cell vehicle 10, a fuel cell stack 14 is disposed in a motor compartment 18, which is located near front wheels 16$f$. A hydrogen tank 90 (described below) is disposed between rear wheels 16$r$.

Figure 2:
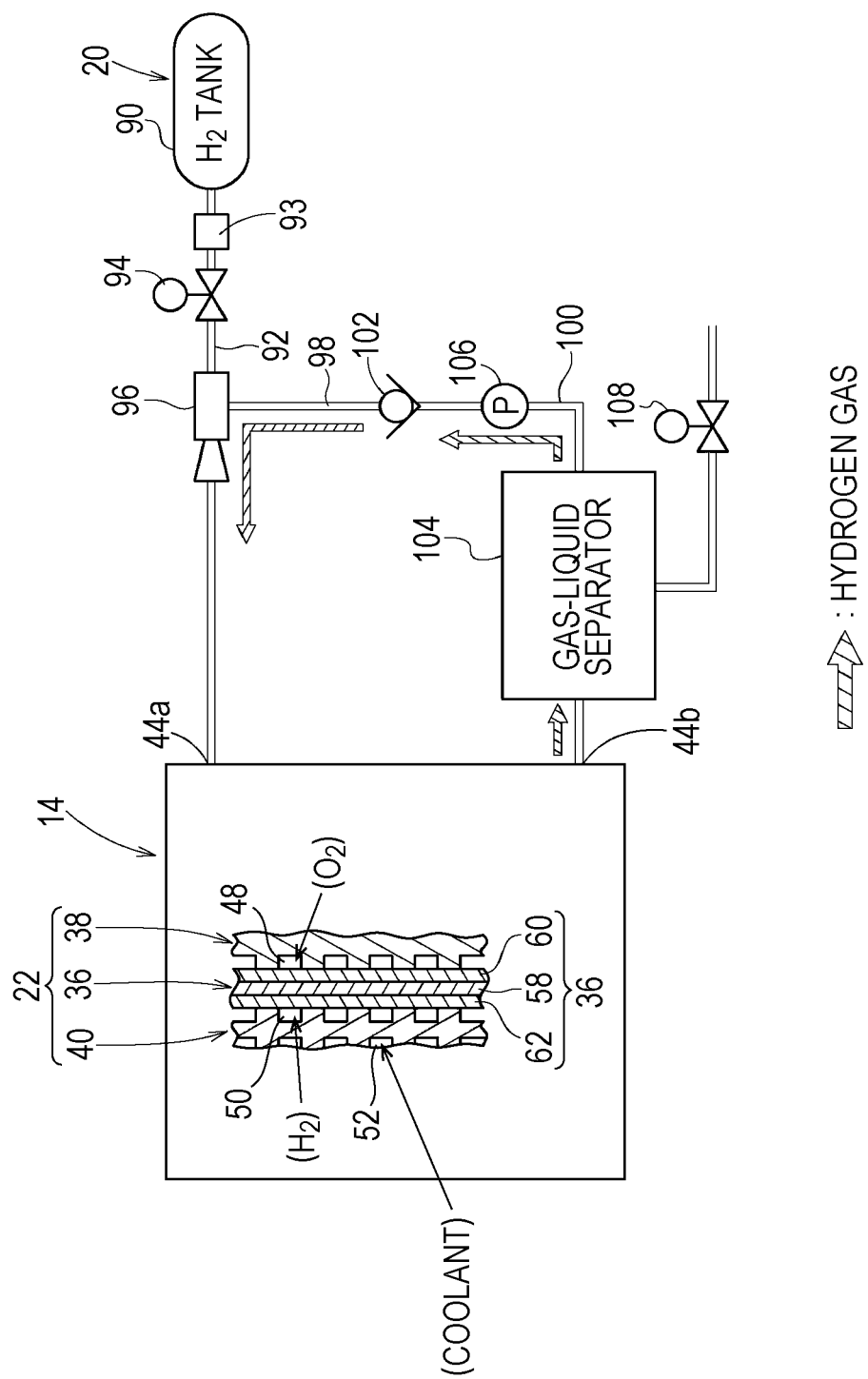
FIG. 2 is a schematic block diagram of the fuel cell vehicle.

Referring to FIG. 2, the fuel cell vehicle 10 includes the fuel cell stack 14 and a fuel gas supplying apparatus 20 that supplies a fuel gas to the fuel cell stack 14. The fuel cell vehicle 10 further includes an oxidant gas supplying apparatus (not shown) that supplies an oxidant gas to the fuel cell stack 14 and a coolant supplying apparatus (not shown) that supplies a coolant to the fuel cell stack 14.

Figure 3:
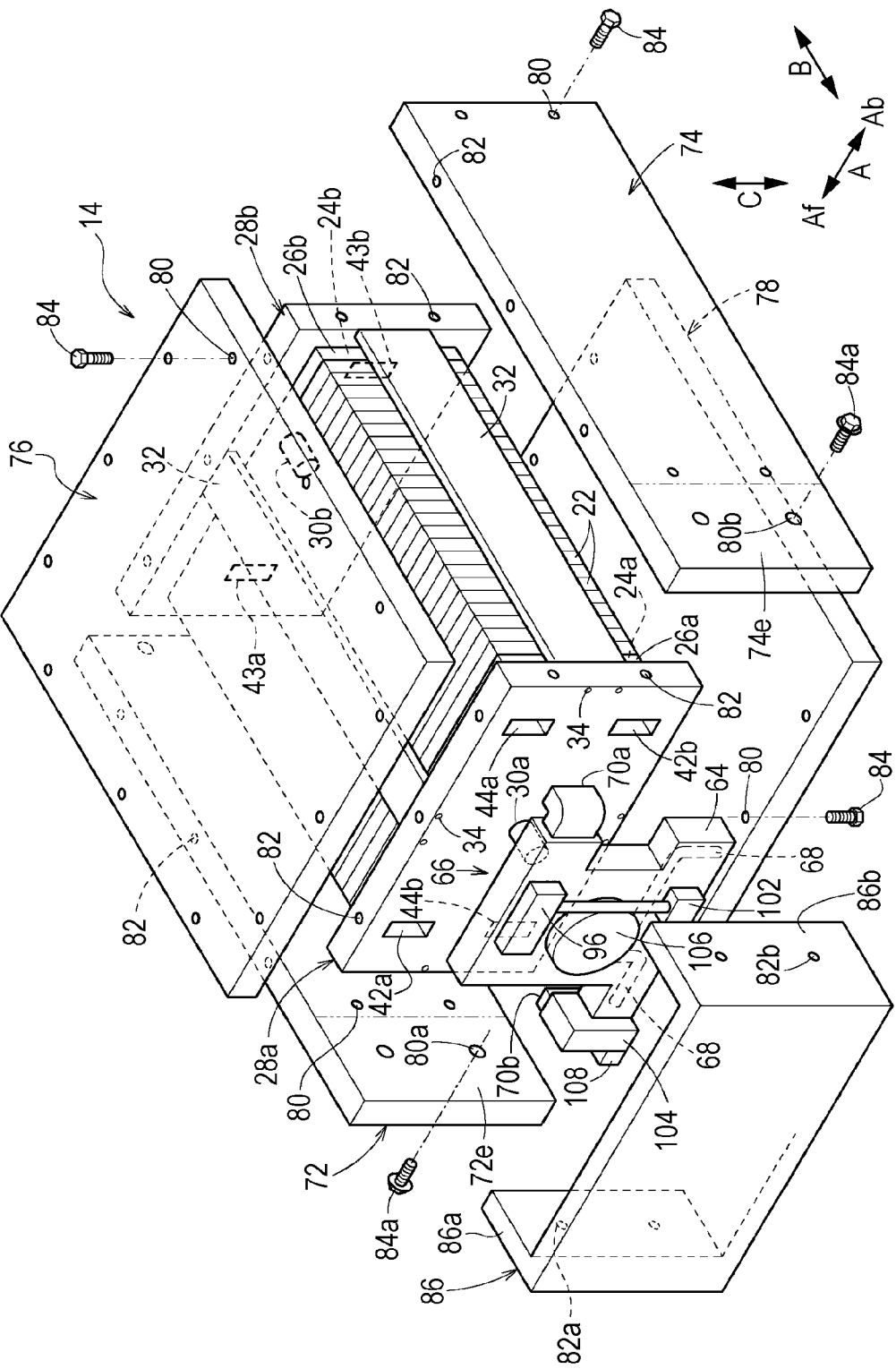
FIG. 3 is a partially exploded perspective view of a main part of the fuel cell vehicle.

Referring to FIG. 3, the fuel cell stack 14 includes a plurality of fuel cells 22 stacked in the vehicle width direction (direction of arrow B). At one end of the fuel cells 22 in the stacking direction, a first terminal plate 24$a$, a first insulation plate 26$a$, and a first end plate (one of a pair of end plates) 28$a$ are sequentially arranged outward. At the other end of the fuel cells 22 in the stacking direction, a second terminal plate 24b, a second insulation plate 26b, and a second end plate 28b are sequentially arranged outward.

The first end plate 28a and the second end plate 28b each has an outer size larger than that of each of the fuel cells 22, the first insulation plate 26a, and the second insulation plate 26b. The first terminal plate 24a is disposed in a recess in the first insulation plate 26a, and the second terminal plate 24b is disposed in a recess in the second insulation plate 26b.

The first end plate 28a has a horizontally-elongated shape. A first electric power output terminal 30a, which is connected to the first terminal plate 24a, extends outward from a central part of the first end plate 28a. The second end plate 28b has a horizontally-elongated shape. A second electric power output terminal 30b, which is connected to the second terminal plate 24b, extends outward from a central part of the second end plate 28b. Ends of connection bars 32 are fixed to the each sides of the first end plate 28a and the second end plate 28b with a plurality of screws 34, thereby applying a clamping load to the stacked fuel cells 22 in the stacking direction (direction of arrow B).

Referring to FIG. 2, in the fuel cell 22, a membrane electrode assembly 36 is sandwiched between a first separator 38 and a second separator 40. Each of the first separator 38 and the second separator 40 is a metal separator or a carbon separator. The metal separator may be made from, for example, a steel plate, a stainless steel plate, an aluminum plate, or a galvanized steel plate.

Referring to FIG. 3, an oxidant gas inlet manifold 42a, a coolant inlet manifold 43a, and a fuel gas outlet manifold 44b are formed in the fuel cells 22 so as to extend in the stacking direction (direction of arrow B) through one end portion of each of the fuel cells 22 in the direction of arrow A. The manifolds 42a, 43a, and 44b are arranged in the direction of arrow C (vertical direction). An oxidant gas, such as an oxygen-containing gas (hereinafter also referred to as "air"), is supplied through the oxidant gas inlet manifold 42a. A coolant is supplied through the coolant inlet manifold 43a. A fuel gas, such as a hydrogen-containing gas (hereinafter also referred to as "hydrogen gas") is discharged through the fuel gas outlet manifold 44b.

A fuel gas inlet manifold 44a, a coolant outlet manifold 43b, and an oxidant gas outlet manifold 42b are formed in the fuel cells 22 so as to extend in the direction of arrow B through the other end portion of each of the fuel cells 22 in the direction of arrow A. The manifolds 44a, 43b, and 42b are arranged in the direction of arrow C. The fuel gas is supplied through the fuel gas inlet manifold 44a, the coolant is discharged through the coolant outlet manifold 43b, and the oxidant gas is discharged through the oxidant gas outlet manifold 42b.

Referring to FIG. 2, an oxidant gas channel 48, which is connected to the oxidant gas inlet manifold 42a and the oxidant gas outlet manifold 42b, is formed on a surface of the first separator 38 facing the membrane electrode assembly 36. A fuel gas channel 50, which is connected to the fuel gas inlet manifold 44a and the fuel gas outlet manifold 44b, is formed on a surface of the second separator 40 facing the membrane electrode assembly 36.

A coolant channel 52, through which the coolant inlet manifold 43a is connected to the coolant outlet manifold 43b, is formed between the second separator 40 of the fuel cell 22 and the first separator 38 of an adjacent fuel cell 22. Sealing members (not shown) are integrally or independently formed on the first separator 38 and the second separator 40.

The membrane electrode assembly 36 includes a solid polymer electrolyte membrane 58, and a cathode electrode 60 and an anode electrode 62 sandwiching the solid polymer electrolyte membrane 58 therebetween. The solid polymer electrolyte membrane 58 is, for example, a thin film made of perfluorosulfonic acid copolymers and impregnated with water. The cathode electrode 60 and the anode electrode 62 each include a gas diffusion layer and an electrode catalyst layer. The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 58.

Referring to FIG. 3, the oxidant gas inlet manifold 42a, the oxidant gas outlet manifold 42b, the fuel gas inlet manifold 44a, and the fuel gas outlet manifold 44b extend through the first end plate 28a. The coolant inlet manifold 43a and the coolant outlet manifold 43b extend through the second end plate 28b.

A part of a fuel gas device assembly 66 (a plurality of fuel gas devices) is disposed on an outer surface of the first end plate 28a (which is opposite to a surface facing the stack of the fuel cells 22) with a block member 64 therebetween. The fuel gas device assembly 66, which is attached to the block member 64, includes at least one of an ejector 96, a hydrogen pump 106, a gas-liquid separator (tank) 104, a purge valve 108, and a check valve 102 (which are described below). The fuel gas device assembly 66 may include, for example, an injector (not shown).

A passage 68 (not shown) for supplying a fuel gas to and discharging the fuel gas from a predetermined device is formed in the block member 64. Piping portions 70a and 70b, which are connected to the fuel gas inlet manifold 44a and the fuel gas outlet manifold 44b, are disposed on the block member 64 so as to be integrated with or independent from the block member 64. The block member 64 is fixed to the first end plate 28a with screws or the like.

Figure 4:
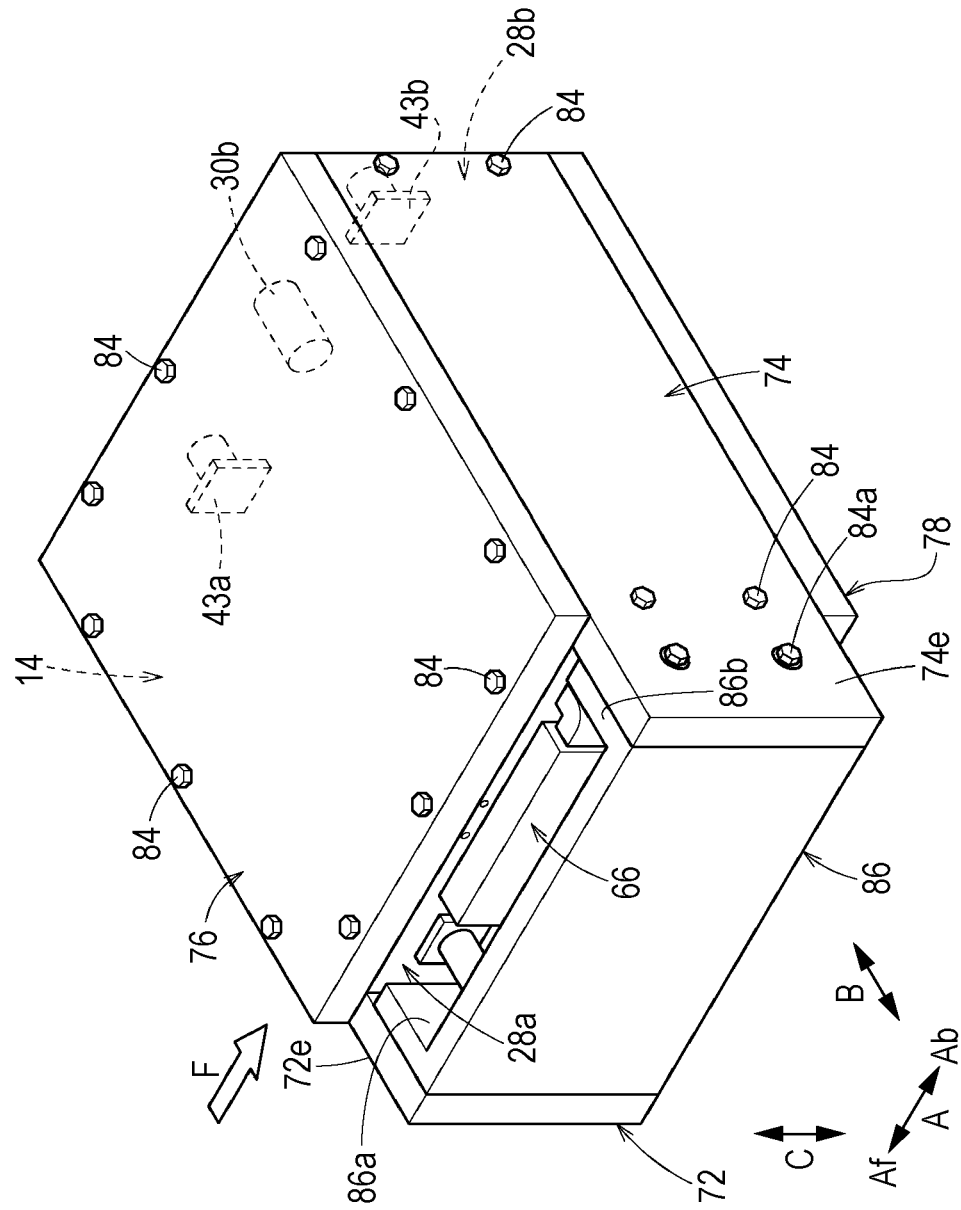
FIG. 4 is a perspective view of the main part of the fuel cell vehicle.

Referring to FIGS. 3 and 4, a front side panel 72, a back side panel 74, an upper panel 76, and a lower panel 78 are attached to the fuel cell stack 14. The front side panel 72, the back side panel 74, the upper panel 76, and the lower panel 78 are fixed to each other and to the first end plate 28a and the second end plate 28b with screws 84, which are inserted through holes 80 and screwed into screw holes 82.

The front side panel 72 is fixed to side surfaces of the first end plate 28a and the second end plate 28b, the side surfaces facing forward in the vehicle driving direction (direction of arrow Af). The front side panel 72 includes a protruding end portion 72e that protrudes from the first end plate 28a outward in the vehicle width direction (direction of arrow B).

Figure 5:
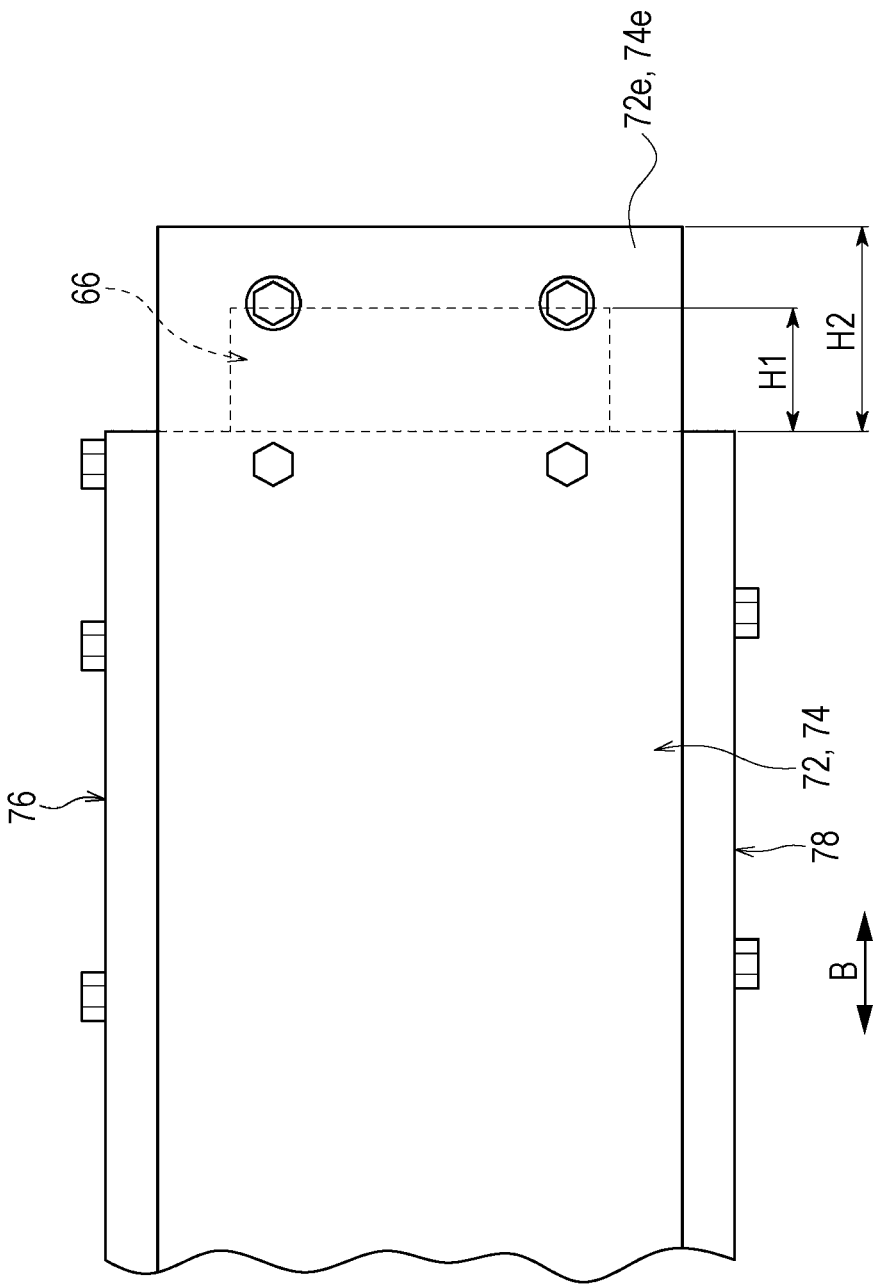
FIG. 5 is a partial side view of the main part of the fuel cell vehicle seen from the front side in the vehicle driving direction.

Referring to FIG. 5, the fuel gas device assembly 66, which is attached to the first end plate 28a, is disposed so as to be covered by the protruding end portion 72e when seen from the front side in the vehicle driving direction. The height H1 of the fuel gas device assembly 66 in the vehicle width direction is less than the length H2 of the protruding end portion 72e in the vehicle width direction.

Referring to FIG. 3, the back side panel 74 is fixed to side surfaces of the first end plate 28a and the second end plate 28b, the side surfaces facing backward in the vehicle driving direction (direction of arrow Ab). The back side panel 74 includes a protruding end portion 74e that protrudes from the first end plate 28a outward in the vehicle width direction (direction of arrow B). Referring to FIG. 5, the height H1 of the fuel gas device assembly 66 in the vehicle width direction is less than the length H2 of the protruding end portion 74e in the vehicle width direction.

Referring to FIGS. 3 and 4, a cover member 86 is attached to the protruding end portion 72e of the front side panel 72 and also attached to the protruding end portion 74e of the back side panel 74 so as to cover the fuel gas device assembly 66. The cover member 86 has a substantially angular-U-shaped cross section. The cover member 86 includes side portions 86a and 86b that extend parallel to each other. The side portions 86a and 86b are in contact with inner surfaces of the protruding end portions 72e and 74e. Screw holes 82a and 82b are formed in the side portions 86a and 86b. Holes 80a and 80b, which are coaxial with the screw holes 82a and 82b, are formed in the protruding end portions 72e and 74e. The holes 80a and 80b have diameters greater than those of the screw holes 82a and 82b so that the position of the cover member 86 can be adjusted in the direction of arrow B and in the direction of arrow C. Screws 84a are inserted through the holes 80a and 80b and screwed into the screw holes 82a and 82b.

Referring to FIG. 2, the fuel gas supplying apparatus 20 includes the hydrogen tank 90 for storing high-pressure hydrogen gas. The hydrogen tank 90 is connected to the fuel gas inlet manifold 44a of the fuel cell stack 14 through a hydrogen supply passage 92. A pressure reducing valve 93, a shut-off valve 94, the ejector 96, and a hydrogen circulation passage 98 are disposed along the hydrogen supply passage 92.

The ejector 96 supplies hydrogen gas from the hydrogen tank 90 to the fuel cell stack 14 through the hydrogen supply passage 92. The ejector 96 sucks an exhaust gas, which includes hydrogen gas that was not consumed in the fuel cell stack 14, from the hydrogen circulation passage 98, and resupplies the exhaust gas to the fuel cell stack 14 as a fuel gas.

An off-gas passage 100 is connected to the fuel gas outlet manifold 44b. The hydrogen circulation passage 98 is connected to the off-gas passage 100. The check valve 102 is disposed in the hydrogen circulation passage 98. A gas-liquid separator 104 and the hydrogen pump 106 are disposed at upstream portions of the off-gas passage 100. The purge valve 108 is connected to the gas-liquid separator 104.

The operation of the fuel cell vehicle 10 having the aforementioned structure will be described.

Referring to FIG. 2, to start operating the fuel cell vehicle 10, the shut-off valve 94 of the fuel gas supplying apparatus 20 is opened. Hydrogen gas flows out of the hydrogen tank 90, and the hydrogen gas is depressurized by the pressure reducing valve 93 and supplied to the hydrogen supply passage 92. The hydrogen gas is supplied to the fuel gas inlet manifold 44a of the fuel cell stack 14 through the hydrogen supply passage 92.

The hydrogen gas is introduced from the fuel gas inlet manifold 44a into the fuel gas channel 50 of the second separator 40. The hydrogen gas is supplied along the anode electrode 62 of the membrane electrode assembly 36.

An oxidant gas (air) is supplied from an oxidant gas supplying apparatus (not shown) and introduced into the oxidant gas inlet manifold 42a of the fuel cell stack 14. The oxidant gas is introduced from the oxidant gas inlet manifold 42a to the oxidant gas channel 48 of the first separator 38. The oxidant gas is supplied along the cathode electrode 60 of the membrane electrode assembly 36.

Accordingly, in the membrane electrode assembly 36, the hydrogen gas supplied to the anode electrode 62 and the air supplied to the cathode electrode 60 are consumed in electrochemical reactions in the electrode catalyst layers, thus generating electric power.

Referring to FIG. 2, hydrogen gas that has been consumed is discharged from the fuel gas outlet manifold 44b to the off-gas passage 100, and the discharged hydrogen gas is introduced into the gas-liquid separator 104. The gas-liquid separator 104 removes liquid water from the hydrogen gas. Then, the ejector 96 sucks the hydrogen gas through the hydrogen circulation passage 98, and resupplies the hydrogen gas to the fuel cell stack 14 as a fuel gas. Referring to FIG. 3, air that has been consumed is discharged from the oxidant gas outlet manifold 42b to the outside of the fuel cell stack 14.

A coolant is supplied from the coolant supplying apparatus (not shown) to the coolant inlet manifold 43a. The coolant is introduced into the coolant channel 52 between the first separator 38 and the second separator 40, is used to cool the membrane electrode assembly 36, flows through the coolant outlet manifold 43b, and is discharged to a coolant circulation system.

Referring to FIG. 3, in the first embodiment, the fuel gas device assembly 66 is disposed on the outer surface of the first end plate 28a with the block member 64 therebetween. To be specific, at least one of the ejector 96, the hydrogen pump 106, the gas-liquid separator 104, the purge valve 108, and the check valve 102 is attached to the block member 64.

Moreover, the front side panel 72 is fixed to the side surfaces of the first end plate 28a and the second end plate 28b, the side surfaces facing forward in the vehicle driving direction, and the front side panel 72 includes the protruding end portion 72e, which protrudes from the first end plate 28a outward in the vehicle width direction. Referring to FIG. 5, the fuel gas device assembly 66, which is attached to the first end plate 28a, is disposed so as to be covered by the protruding end portion 72e when seen from the front side in the vehicle driving direction.

Therefore, referring to FIG. 4, when an external load F is applied to the fuel cell stack 14 from the front side in the vehicle driving direction, the front side panel 72 receives the external load F. Accordingly, the fuel gas device assembly 66 is protected by the protruding end portion 72e of the front side panel 72, so that the fuel gas device assembly 66 can be reliably prevented from receiving the external load F.

Thus, it is not necessary to use a dedicated protection structure, a casing, or the like in order to protect the fuel gas device assembly 66. Therefore, an advantage is obtained in that damage that might be caused by an external load F particularly to the fuel gas device assembly 66 can be suppressed to a minimum level with a simple and compact structure.

The back side panel 74 is fixed to the side surfaces of the first end plate 28a and the second end plate 28b, the side surfaces facing backward in the vehicle driving direction, and the back side panel 74 includes the protruding end portion 74e, which protrudes from the first end plate 28a outward in the vehicle width direction. Referring to FIG. 5, the fuel gas device assembly 66, which is attached to the first end plate 28a, is disposed so as to be covered by the protruding end portion 74e when seen from the back side in the vehicle driving direction.

Accordingly, when an external load F is applied to the fuel cell stack 14 from the back side in the vehicle driving direction, the back side panel 74 receives the external load F. Thus, damage to the fuel gas device assembly 66 can be appropriately suppressed by the protruding end portion 74e.

Furthermore, the cover member 86 is attached to the protruding end portion 72e of the front side panel 72 and to the protruding end portion 74e of the back side panel 74 so as to cover the fuel gas device assembly 66. Thus, damage to the fuel gas device assembly 66 can be suppressed to a minimum level.

Figure 6:
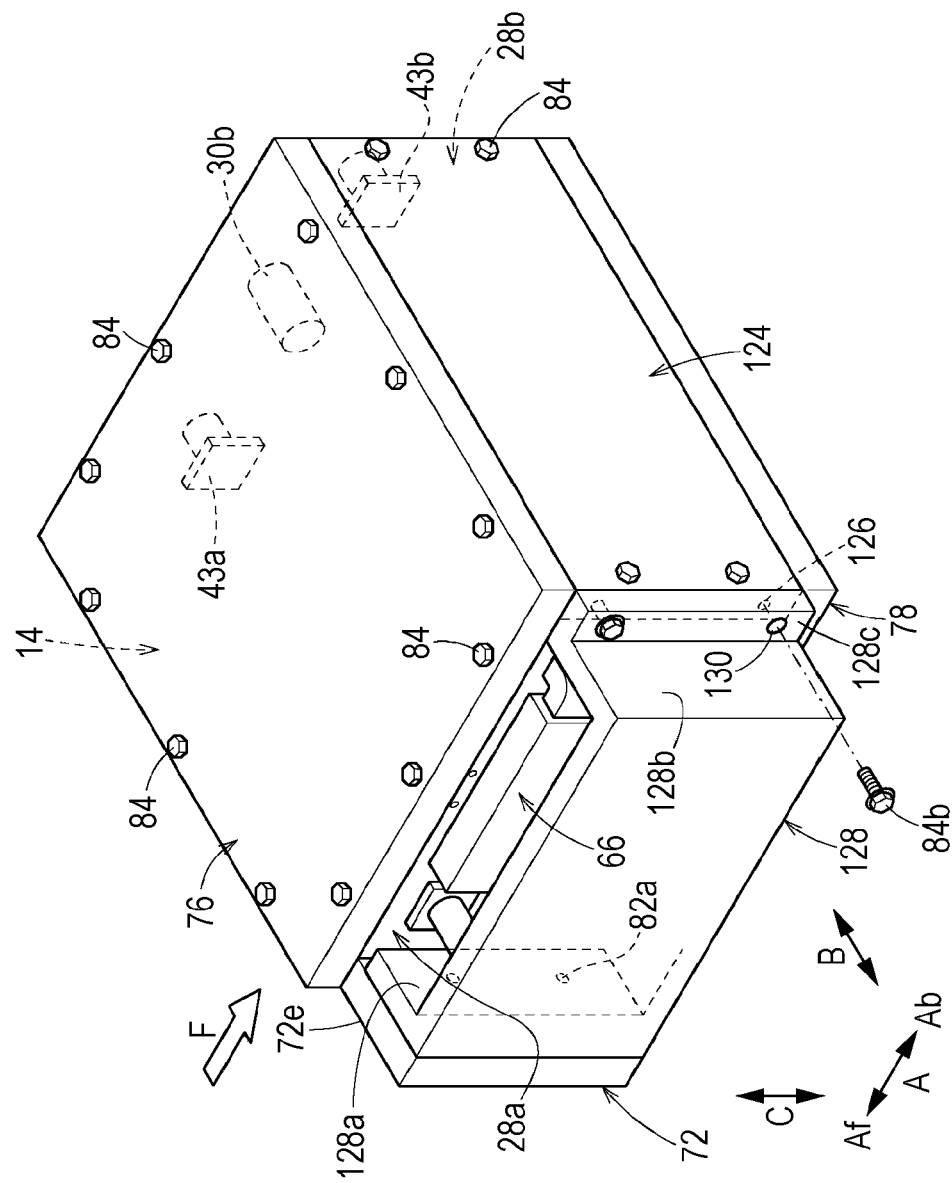
FIG. 6 is a perspective view of a main part of a fuel cell vehicle according to a second embodiment.

FIG. 6 is a perspective view of a main part of a fuel cell vehicle 120 according to a second embodiment.

Elements of the fuel cell vehicle that are the same as those of the fuel cell vehicle 10 according to the first embodiment will be denoted by the same numerals and detailed descriptions of such elements will be omitted. The same applies to third and forth embodiments described below.

In the fuel cell vehicle 120, the front side panel 72, a back side panel 124, the upper panel 76, and the lower panel 78 are attached to the fuel cell stack 14. The length of the back side panel 124 in the direction of arrow B is approximately the same as the length of each of the upper panel 76 and the lower panel 78 in the direction of arrow B. Screw holes 126 are formed in an end surface of the back side panel 124.

Figure 7:
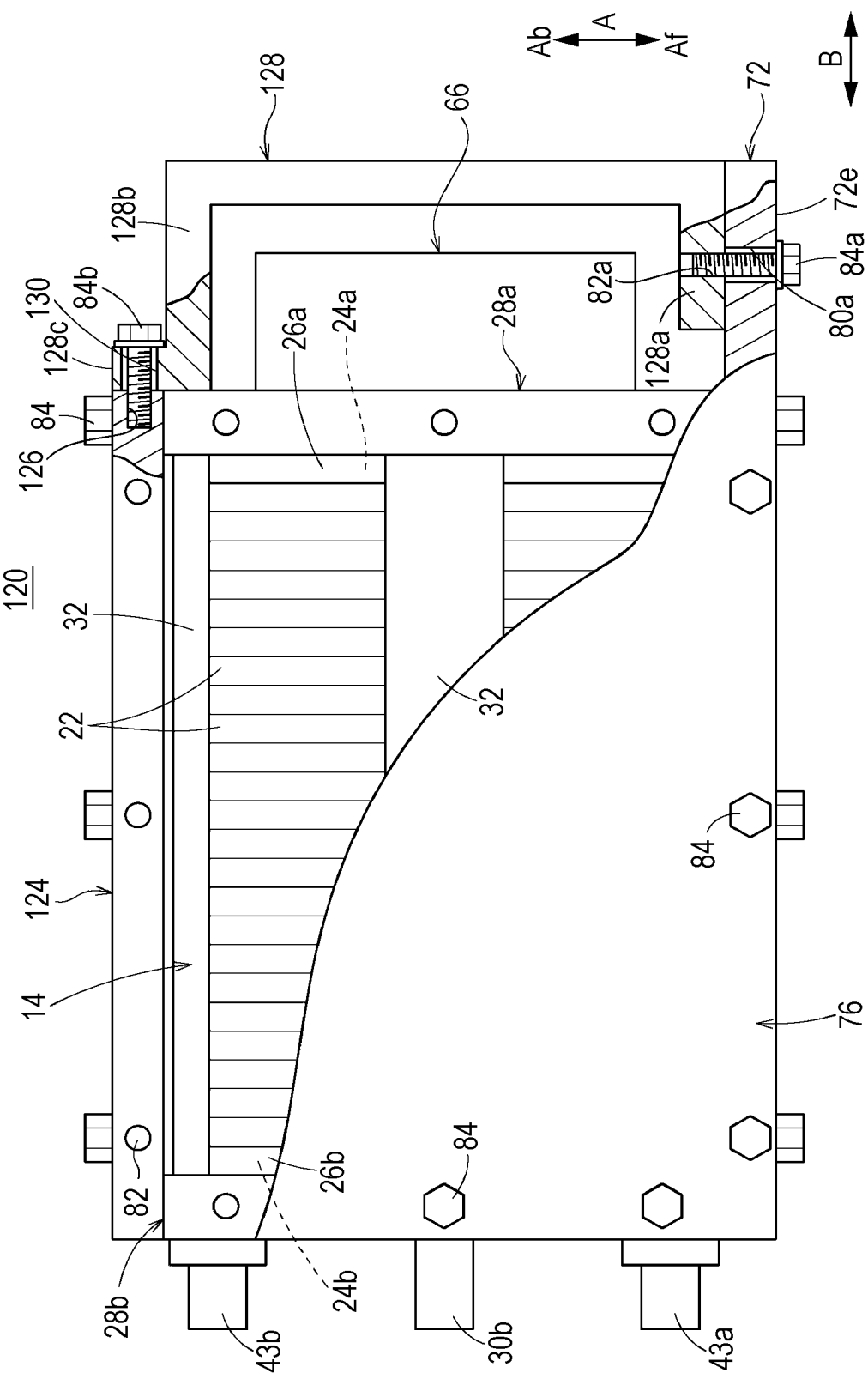
FIG. 7 is a plan view of the main part of the fuel cell vehicle.

Referring to FIGS. 6 and 7, a cover member 128 is fixed to the protruding end portion 72*e* of the front side panel 72 and to the end surface of the back side panel 124. The cover member 128 includes a side portion 128*a*, a side portion 128*b*, and a flange portion 128*c*. The side portion 128*a* is in contact with an inner surface of the protruding end portion 72*e*. The side portion 128*b* extends parallel to the side portion 128*a* and is longer than the side portion 128*a*. The flange portion 128*c* is bent away from an end of the side portion 128*b* so as to be in contact with the end surface of the back side panel 124.

The screw holes 82*a* are formed in the side portion 128*a* so as to be coaxial with the holes 80*a* in the protruding end portion 72*e*. The screws 84*a* are inserted through the holes 80*a*, and end portions of the screws 84*a* are screwed into the screw holes 82*a*. Holes 130 are formed in the flange portion 128*c* so as to be coaxial with the screw holes 126 formed in the back side panel 124. The holes 130 have diameters greater than those of the screw holes 126. Screws 84*b* are inserted through the holes 130 and screwed into the screw holes 126.

In the second embodiment having the aforementioned structure, the front side panel 72 is disposed so as to cover the front side of the fuel gas device assembly 66 in the vehicle driving direction. Moreover, the cover member 128 is disposed so as to cover an outer side of the fuel gas device assembly 66 (the outer side facing outward in the direction of arrow B in FIGS. 6 and 7) and the back side of the fuel gas device assembly 66 in the vehicle driving direction. Thus, as with the first embodiment, an advantage is obtained in that damage that might be caused by an external load F particularly to the fuel gas device assembly 66 can be suppressed to a minimum level with a simple and compact structure.

Figure 8:
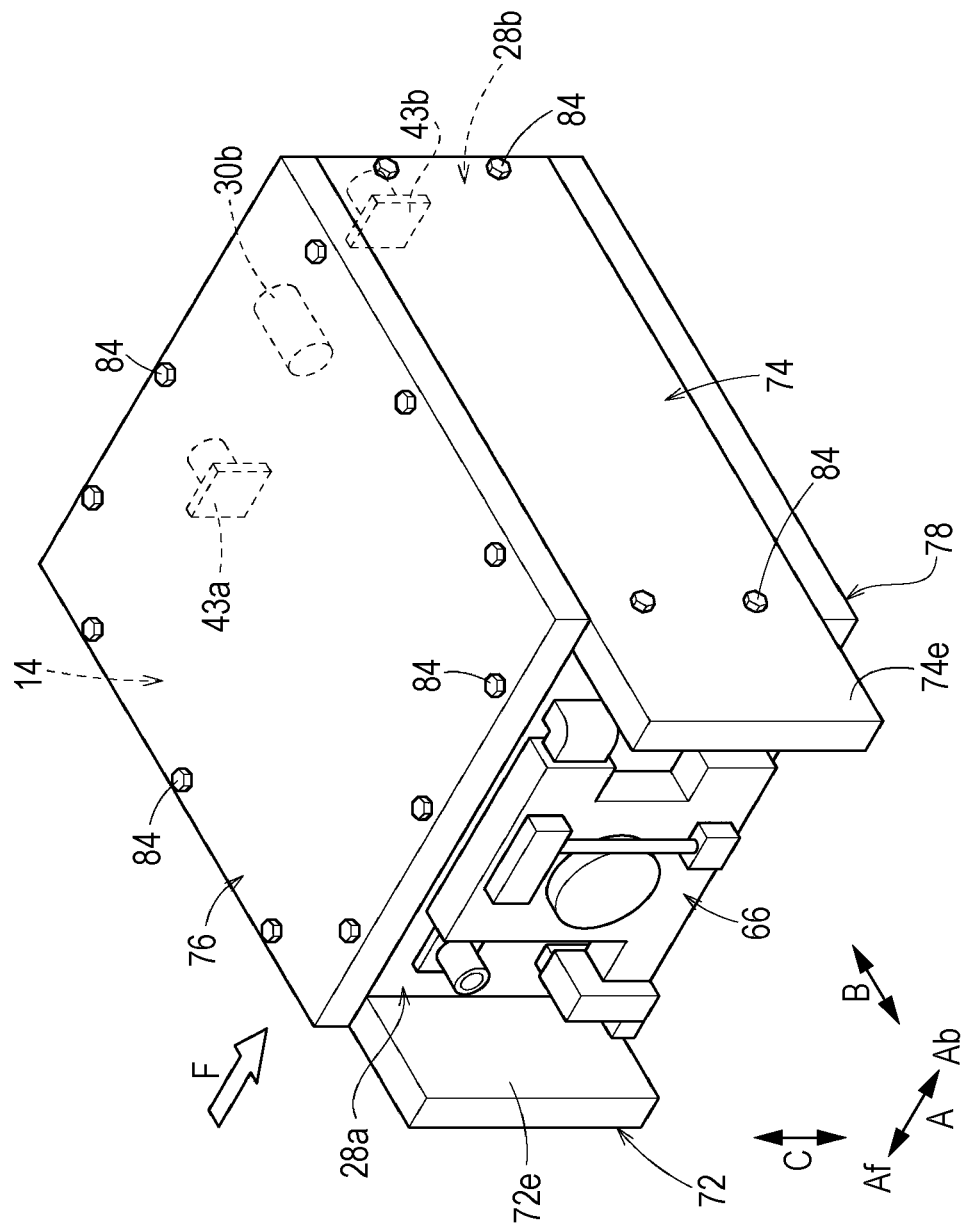
FIG. 8 is a perspective view of a main part of a fuel cell vehicle according to a third embodiment.

FIG. 8 is a perspective view of a main part of a fuel cell vehicle 140 according to a third embodiment.

In the fuel cell vehicle 140, the cover member 86 of the first embodiment is not necessary. In particular, it is not necessary to use the cover member 86 in a case where an external load F is likely to be applied to the fuel cell vehicle 140 from the front side or the back side in the vehicle driving direction. This is because, in such a case, damage to the fuel gas device assembly 66 can be appropriately suppressed by the protruding end portion 72*e* of the front side panel 72 and the protruding end portion 74*e* of the back side panel 74.

FIG. 9 is a partially exploded perspective view of a main part of a fuel cell vehicle 150 according to a fourth embodiment.

The fuel cell vehicle 150 includes an external coolant supply manifold (external coolant manifold) 152*a* that is disposed on the second end plate 28*b* of the fuel cell stack 14. The external coolant supply manifold 152*a* is connected to the coolant inlet manifold 43*a*. The fuel cell vehicle 150 further includes an external coolant discharge manifold (external coolant manifold) 152*b* that is disposed on the second end plate 28*b*. The external coolant discharge manifold 152*b* is connected to the coolant outlet manifold 43*b*.

A front side panel 72L, a back side panel 74L, the upper panel 76, and the lower panel 78 are attached to the fuel cell stack 14. The front side panel 72L includes, in addition to the protruding end portion 72*e*, a protruding end portion 72*e*1 that protrudes from the second end plate 28*b* outward in the vehicle width direction (direction of arrow B). The back side panel 74L includes, in addition to the protruding end portion 74*e*, a protruding end portion 74*e*1 that protrudes from the second end plate 28*b* outward in the vehicle width direction (direction of arrow B).

The external coolant supply manifold 152*a* and the external coolant discharge manifold 152*b* are disposed so as to be covered by the protruding end portion 72*e*1 of the front side panel 72L when seen from the front side in the vehicle driving direction. The external coolant supply manifold 152*a* and the external coolant discharge manifold 152*b* are disposed so as to be covered by the protruding end portion 74*e*1 when seen from the back side in the vehicle driving direction.

A cover member 154 is attached to the protruding end portions 72*e*1 and 74*e*1 so as to cover the external coolant supply manifold 152*a* and the external coolant discharge manifold 152*b*. The cover member 154 has a substantially angular-U-shaped cross section. The cover member 154 includes side portions 156*a* and 156*b* that extend parallel to each other. The side portions 156*a* and 156*b* are in contact with inner surfaces of the protruding end portions 72*e*1 and 74*e*1. The cover member 154 is fixed to the protruding end portions 72*e*1 and 74*e*1 with the screws 84*b*. The cover member 154 may be omitted if it is not necessary.

In the fourth embodiment having the aforementioned structure, the external coolant supply manifold 152*a* and the external coolant discharge manifold 152*b* are covered by the protruding end portions 72*e*1 and 74*e*1 (and may be covered also by the cover member 154 as necessary). Accordingly, an advantage can be obtained in that, the external coolant supply manifold 152*a* and the external coolant discharge manifold 152*b* can be reliably protected against an external load F.

A fuel cell vehicle according to an aspect of the present disclosure includes a fuel cell stack including a plurality of fuel cells and a pair of end plates. The fuel cells are stacked in a vehicle width direction, and each of the fuel cells generates electric power by an electrochemical reaction between a fuel gas and an oxidant gas. The pair of end plates are disposed at both ends of the fuel cell stack in a stacking direction.

The fuel cell vehicle includes a front side panel fixed to side surfaces of the pair of end plates, the side surfaces facing forward in a vehicle driving direction, the front side panel including a protruding end portion that protrudes from one of the end plates outward in the vehicle width direction. The fuel cell vehicle includes a fuel gas device disposed on the one of the end plates so as to be covered by the protruding end portion when seen from a front side in the vehicle driving direction.

The fuel cell vehicle may further include a back side panel fixed to side surfaces of the pair of end plates, the side surfaces facing backward in the vehicle driving direction. In this case, a cover member is preferably fixed to an end portion of the back side panel and to the protruding end portion so as to cover the fuel gas device, the end portion of the back side panel being adjacent to the one of the end plates.

The fuel cell vehicle may further include an external coolant manifold that causes a coolant to flow, and the front side panel may include another protruding end portion that protrudes from the other of the pair of end plates outward in the vehicle width direction. In this case, the external coolant manifold is preferably disposed on the other of the pair of end plates so as to be covered by the other protruding end portion when seen from the front side in the vehicle driving direction.

According to the present disclosure, a front side panel includes a protruding end portion at an end portion of the side panel, the protruding end portion protruding outward from one of end plates. The protruding end portion covers a fuel gas device, which is disposed on the one of the end plates, when seen from the front side in the vehicle driving direction. When an external load is applied from the front side in the vehicle driving direction, the front side panel receives the external load and the protruding end portion prevents the external load from being applied to the fuel gas device.

Accordingly, it is not necessary to use a dedicated protection structure, a casing, or the like in order to protect the fuel gas device. Thus, damage that might be caused by an external load particularly to the fuel gas device can be suppressed to a minimum level with a simple and compact structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
   a fuel cell stack including
      a plurality of fuel cells stacked in a vehicle width direction, each of the fuel cells generating electric power by an electrochemical reaction between a fuel gas and an oxidant gas, and
      a pair of end plates disposed at both ends of the fuel cell stack in a stacking direction;
   a front side panel fixed to side surfaces of the pair of end plates, the side surfaces facing forward in a vehicle driving direction, the front side panel including a protruding end portion that protrudes from one of the end plates outward in the vehicle width direction; and
   a fuel gas device disposed on the one of the end plates so as to be covered by the protruding end portion when seen from a front side in the vehicle driving direction.

2. The fuel cell vehicle according to claim 1, further comprising:
   a back side panel fixed to side surfaces of the pair of end plates, the side surfaces facing backward in the vehicle driving direction; and
   a cover member fixed to an end portion of the back side panel and to the protruding end portion so as to cover the fuel gas device, the end portion of the back side panel being adjacent to the one of the end plates.

3. The fuel cell vehicle according to claim 1, further comprising:
   an external coolant manifold that causes a coolant to flow,
   wherein the front side panel includes another protruding end portion that protrudes from the other of the pair of end plates outward in the vehicle width direction, and
   wherein the external coolant manifold is disposed on the other of the pair of end plates so as to be covered by the other protruding end portion when seen from the front side in the vehicle driving direction.

4. A fuel cell vehicle comprising:
   a fuel cell stack comprising:
      a plurality of fuel cells stacked in a stacking direction extending in a vehicle width direction, each of the plurality of fuel cells being configured to generate electric power through an electrochemical reaction between a fuel gas and an oxidant gas;
      one end and another end opposite to the one end in the stacking direction;
      a first end plate disposed at the one end; and
      a second end plate disposed at the another end;
   a front side panel connected to side surfaces of the first and second end plates, the side surfaces facing forward in a vehicle driving direction, the front side panel including a first protruding end portion that protrudes from the first end plate outward in the vehicle width direction; and
   a fuel gas device disposed on the first end plate so as to be covered by the first protruding end portion when seen from a front side in the vehicle driving direction.

5. The fuel cell vehicle according to claim 4, further comprising:
   a back side panel connected to other side surfaces of the first and second end plates, the other side surfaces facing backward in the vehicle driving direction; and
   a cover member connected to an end portion of the back side panel and to the first protruding end portion so as to cover the fuel gas device, the end portion of the back side panel being adjacent to the first end plate.

6. The fuel cell vehicle according to claim 4, further comprising:
   an external coolant manifold that causes a coolant to flow,
   wherein the front side panel includes a second protruding end portion that protrudes from the second end plate outward in the vehicle width direction, and
   wherein the external coolant manifold is disposed on the second end plate so as to be covered by the second protruding end portion when seen from the front side in the vehicle driving direction.

7. The fuel cell vehicle according to claim 4,
   wherein the front side panel is fixed to the side surfaces of the first and second end plates.

8. The fuel cell vehicle according to claim 5,
   wherein the back side panel is fixed to the other side surfaces of the first and second end plates, and
   wherein the cover member is fixed to the end portion of the back side panel and to the first protruding end portion so as to cover the fuel gas device.

9. The fuel cell vehicle according to claim 4,
   wherein a height of the fuel gas device in the vehicle width direction is less than a length of the first protruding end portion in the vehicle width direction.

10. The fuel cell vehicle according to claim 4, further comprising:
    a back side panel connected to other side surfaces of the first and second end plates, the other side surfaces facing backward in the vehicle driving direction, the back side panel including a third protruding end portion that protrudes from the first end plate outward in the vehicle width direction; and
    a cover member connected to the third protruding end portion and to the first protruding end portion so as to cover the fuel gas device.

11. The fuel cell vehicle according to claim 10,
wherein the back side panel is fixed to the other side surfaces of the first and second end plates, and
wherein the cover member is fixed to the third protruding end portion and to the first protruding end portion so as to cover the fuel gas device.

12. The fuel cell vehicle according to claim 1,
wherein the fuel gas device includes at least one of an ejector, a hydrogen pump, a gas-liquid separator, a purge valve, and a check valve.

13. The fuel cell vehicle according to claim 1,
wherein a height of the fuel gas device in the vehicle width direction is less than a length of the protruding end portion in the vehicle width direction.

14. The fuel cell vehicle according to claim 1, further comprising:
a back side panel connected to side surfaces of the pair of end plates facing backward in the vehicle driving direction, the back side panel including an other protruding end portion that protrudes from one of the end plates outward in the vehicle width direction; and
a cover member connected to the other protruding end portion of the back side panel and to the protruding end portion of the front side panel so as to cover the fuel gas device.

15. The fuel cell vehicle according to claim 4,
wherein the fuel gas device includes at least one of an ejector, a hydrogen pump, a gas-liquid separator, a purge valve, and a check valve.

16. The fuel cell vehicle according to claim 14,
wherein the back side panel is fixed to the side surfaces of the pair of end plates facing backward in the vehicle driving direction, and
wherein the cover member is fixed to the other protruding end portion of the back side panel and to the protruding end portion of the front side panel so as to cover the fuel gas device.

* * * * *